United States Patent [19]

Bae

[11] Patent Number: 5,507,605
[45] Date of Patent: Apr. 16, 1996

[54] FINGER HOLE DRILLING MACHINE FOR BOWLING BALL

[76] Inventor: Suk-Kyu Bae, Keryong Jootaeg 10-301, 963-10, Shinjung-4Dong, Kangseo-Ku, Seoul, Rep. of Korea

[21] Appl. No.: 342,261

[22] Filed: Nov. 18, 1994

[30]     Foreign Application Priority Data

Nov. 22, 1993 [KR]   Rep. of Korea ............... 93-24936

[51] Int. Cl.⁶ ............................................. B23B 41/00
[52] U.S. Cl. .................... 408/89; 408/91; 408/DIG. 1; 269/21; 269/60; 269/71
[58] Field of Search ................ 408/89, 91, 104, 408/109, DIG. 1; 269/21, 60, 71; 279/3

[56]           References Cited

U.S. PATENT DOCUMENTS

| 1,414,970 | 5/1922 | Nelson | 269/60 |
| 1,616,188 | 2/1927 | Hatcher | 269/21 |
| 2,146,906 | 2/1939 | Moller | 408/89 |
| 3,714,703 | 2/1973 | Maples | 408/DIG. 1 |
| 5,409,334 | 4/1995 | Edis et al. | 269/21 |
| 5,427,478 | 6/1995 | Boucher et al. | 408/105 |

*Primary Examiner*—Daniel W. Howell
*Attorney, Agent, or Firm*—Nawrocki, Rooney & Sivertson

[57]              ABSTRACT

A finger hole drilling machine for a bowling ball is disclosed. The drilling machine includes a ball seat assembly, an air suction/expelling valve unit, a marking pen assembly and a turntable assembly. The ball seat assembly has a ball seat housing of the box type for tilting the bowling ball forward and backward, and a ball seat movably placed on the ball seat housing and adapted for tilting the bowling ball leftward and rightward. The drilling machine identically drills the finger holes on a plurality of bowling balls of a bowler, thus to achieve identity of the finger holes of the bowling balls. The drilling machine also readily sets the drilling positions on the bowling balls, thus to save time and to readily finish the finger hole drilling work and to improve the efficiency of the finger hole drilling work.

1 Claim, 13 Drawing Sheets

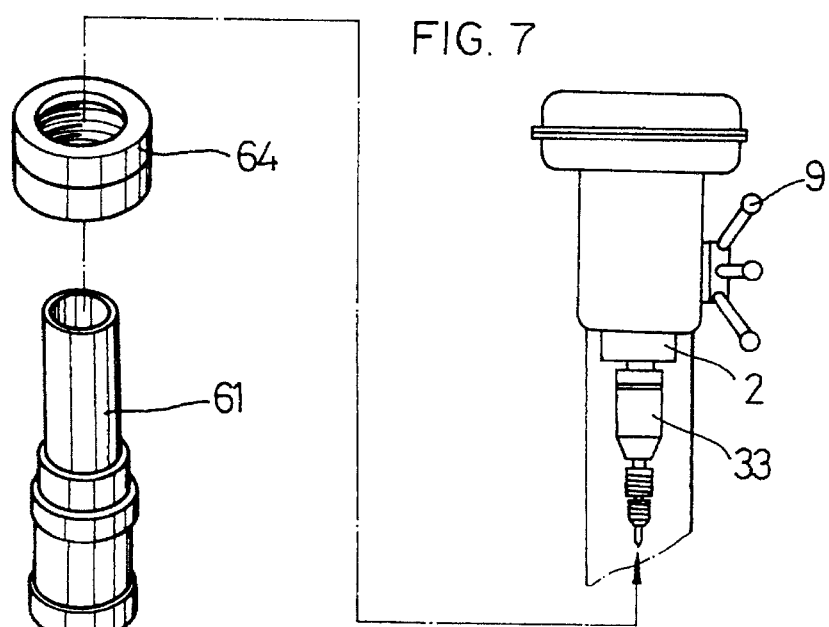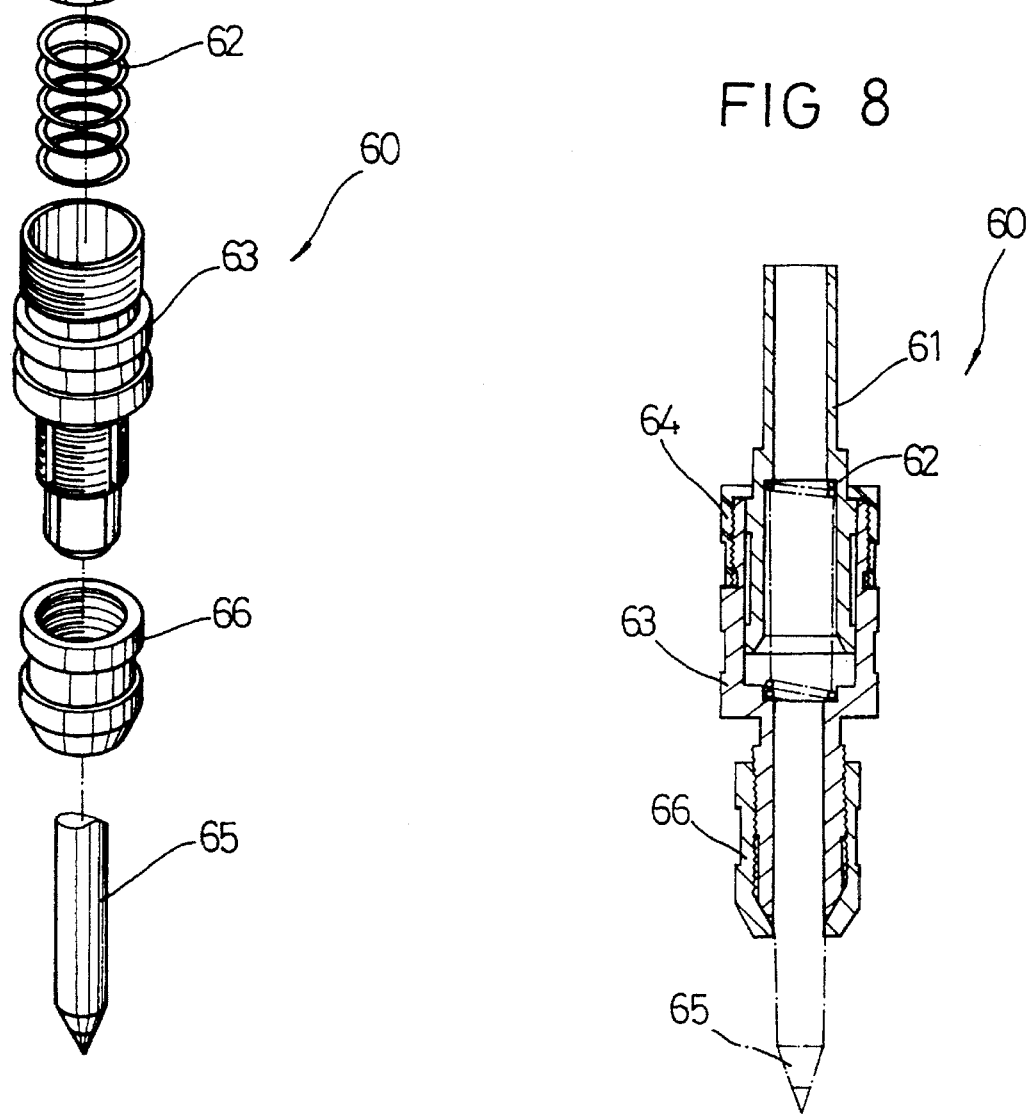
FIG. 7
FIG 8

FINGER HOLE DRILLING MACHINE FOR BOWLING BALL

BACKGROUND OF THE INVENTION

1. Field of the Invention

The present invention relates in general to a finger hole drilling machine for bowling balls and, more particularly, to a structural improvement in such a finger hole drilling machine for precisely drilling the finger holes on a plurality of bowling balls of a bowler at the same positions and at the same drilling angles, so that the finger holes of the bowling balls are identified with each other.

2. Description of the Prior Art

In order to drill the finger holes on a bowling ball using a typical finger hole drilling machine, the bowling ball is marked with finger hole drilling position marks on its spherical surface and tightly clamped at its opposed sides by conventional clamping means. In this state, the desired finger holes are formed on the bowling ball by drilling the bowling ball at the every finger hole drilling position using the typical drilling machine.

However, the above finger hole drilling method has a problem that it is difficult to precisely center the drill of the drilling machine to each of the finger hole drilling position marks on the spherical surface of the bowling ball. Particularly, the above problem caused in the typical finger hole drilling method will become worse when a plurality of bowling balls of a bowler need to be identically provided with their finger holes at the same positions and at the same drilling angles.

That is, bowlers regardless of professional bowlers and amateur bowlers generally have a plurality of bowling balls, that is, practice balls and game balls. The bowling balls of bowlers have their finger holes at different positions due to difference of finger and hand sizes of the bowlers.

In the plurality of bowling balls of a bowler regardless of practice balls and game balls, the finger holes need to be identically drilled on all of the balls at the same positions and at the same drilling angles in order to fit the specified finger and hand sizes, that is, lengths of thumb and of fingers and area of palm of the hand of the bowler. That is, in the plurality of bowling balls of a bowler, the finger holes should be drilled on all of the bowling balls, so that the finger hole depths, the drilling angles and intervals between the finger holes are identified with each other in all the balls of the bowler. When the identity of the finger holes of the bowling balls owned by a bowler is achieved, the bowler will achieve good results in exercise and game.

However, the typical finger hole drilling method, which method comprises the steps of marking the finger hole drilling position marks on the spherical surfaces of the balls and of tightly clamping at opposed sides of each ball using conventional clamping means and of centering the drill to the marks and drilling the finger holes on each bowling ball, nearly fails in precisely drilling the finger holes on each ball and wastes time in clamping the balls. Furthermore, the above drilling method scarcely provides the identity of the finger holes of the balls owned by a bowler, thus to fail in letting the bowler achieve good results in bowling exercise and in bowling game.

SUMMARY OF THE INVENTION

It is, therefore, an object of the present invention to provide a finger hole drilling machine for a bowling ball in which the above problem can be overcome and which precisely drills the finger holes on a plurality of bowling balls of a bowler at the same positions and at the same drilling angles, thus to achieve identity of the finger holes of the bowling balls.

It is another object of the present invention to provide a finger hole drilling machine for a bowling ball which readily sets the finger hole drilling positions on the bowling balls, thus to save time for setting the finger hole drilling positions and to readily finish the finger hole drilling work and to improve the efficiency of the finger hole drilling work.

In order to achieve the above objects, the present invention provides a finger hole drilling machine for a bowling ball comprising a drill chuck fitted to a spindle, a forward/backward feed table and a leftward/rightward feed table, both tables being placed on a base, wherein the improvement comprises: a ball seat housing of the box type for tilting the bowling ball forward and backward, and a ball seat movably placed on the ball seat housing and adapted for tilting the bowling ball leftward and rightward. The ball seat housing has front and rear semicircular slide surfaces provided in the front and rear walls of the ball seat housing, the slide surfaces being formed by partially cutting out the front and rear walls of the housing so as to form semicircular recesses on the front and rear walls; first and second support plates having their semicircular slide surfaces, the support plates being mounted to left and right external side surfaces of the seat housing, the slide surface of the first support plate slidably contacting with a first bearing rotatably mounted on a first support frame fixed to the forward/backward feed table, while the second support plate having a guide plate connected to a first worm wheel through a turning shaft; the first worm wheel gearing into a first worm shaft in a gear box; and a second worm shaft rotatably received in a shaft hole formed in the bottom of the seat housing, the second worm shaft exposing its side section into a space of the seat housing through a longitudinal through hole formed in the bottom of the housing above the shaft hole. Meanwhile, the ball seat has a hemispherical ball seat depression for stably seating and clamping the bowling ball, the depression being provided on the top of the ball seat; an air suction/expelling through hole extending from the seat depression to an air suction/expelling valve unit; all air suction/expelling space defined in the ball seat depression and communicating with the air suction/expelling through hole; front and rear semicircular sliders externally provided on the front and rear end sections of the ball seat, the sliders being slidably laid on the front and rear slide surfaces of the front and rear walls of the seat housing respectively; and a depressed second worm wheel formed on the external surface of the ball seat, the second worm wheel gearing into the second worm shaft of the seat housing.

BRIEF DESCRIPTION OF THE DRAWINGS

Other objects and aspects of the invention will become apparent from the following description of embodiments with reference to the accompanying drawings in which:

FIG. 7 is an exploded perspective view of a marking pen assembly of the drilling machine of the present invention;

FIG. 8 is a sectional view of the marking pen assembly of FIG. 7 after assembled;

FIGS. 12A and 12B are views of a ball seat assembly of a finger hole drilling machine in accordance with a fourth embodiment of the invention respectively, in which:

FIG. 12A is a partially broken front sectional view of the assembly; and

FIG. 12B is a partially broken side sectional view of the assembly;

FIGS. 13A and 13B are views of a ball seat assembly of a finger hole drilling machine in accordance with a fifth embodiment of the invention respectively, in which:

FIG. 13A is a partially broken plan view of the assembly; and

FIG. 13B is a partially broken front view of the assembly;

FIGS. 14A and 14B are views of a finger hole drilling machine in accordance with a sixth embodiment of the invention respectively, in which:

FIG. 14A is a front view of the drilling machine; and

FIG. 14B is a side view of the drilling machine.

DESCRIPTION OF THE PREFERRED EMBODIMENTS

Figure 1:
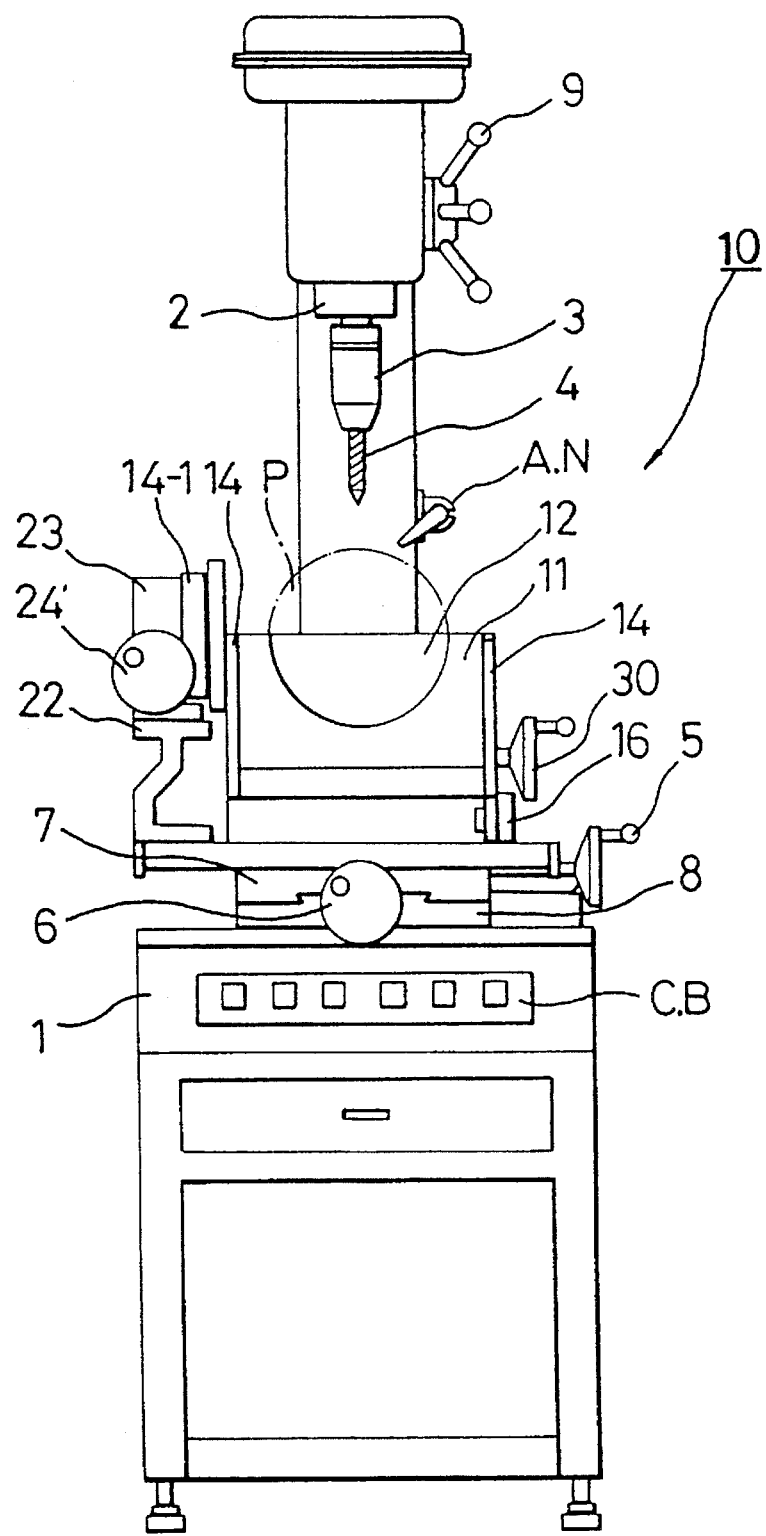
FIG. 1 is a front view of a finger hole drilling machine for a bowling ball in accordance with a primary embodiment of the present invention.
Figure 2:
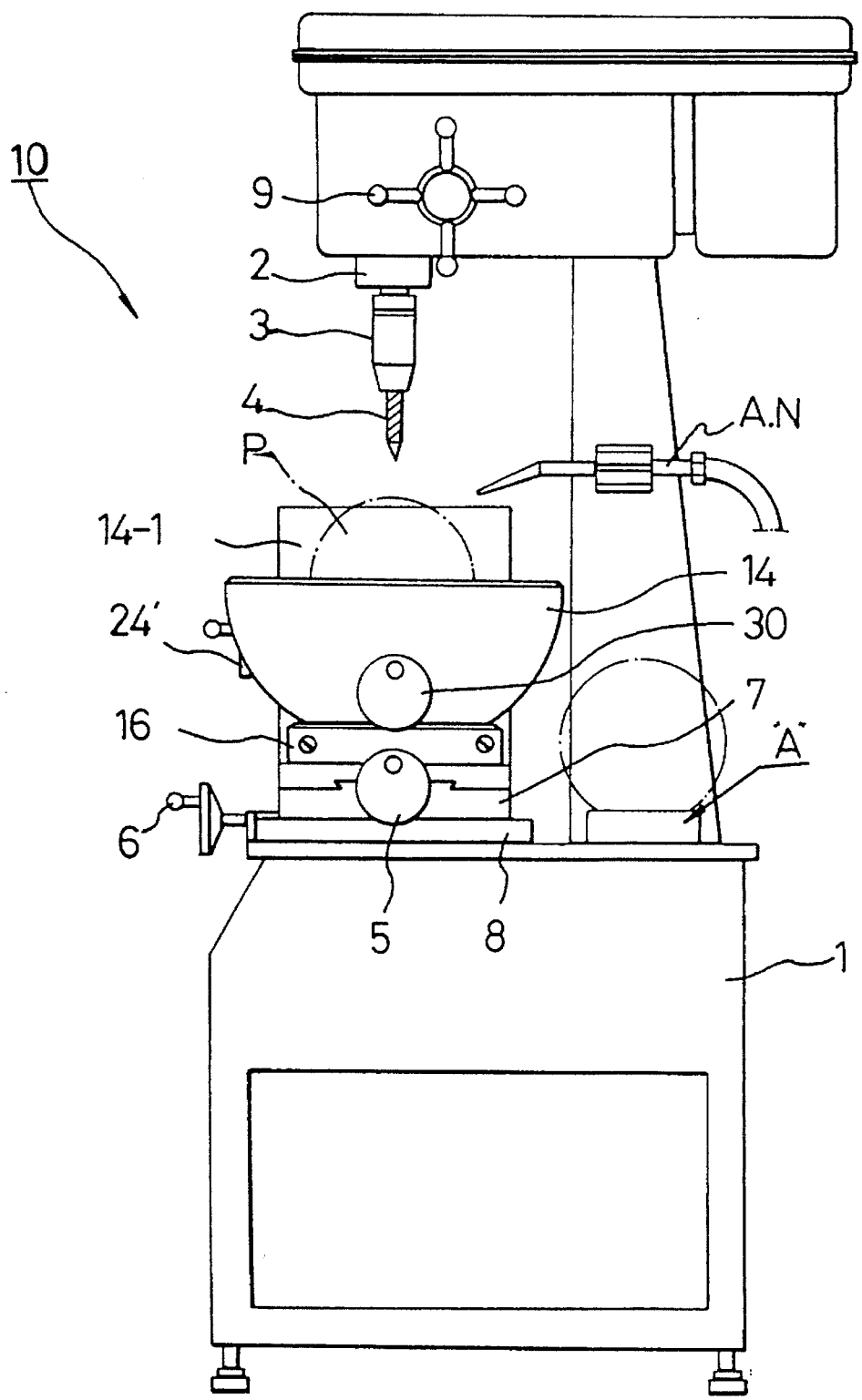
FIG. 2 is a side view of the drilling machine of FIG. 1.

With reference to FIGS. 1 to 9, there is shown a finger hole drilling machine for a bowling ball in accordance with a primary embodiment of the present invention. In the drawings, the reference numeral 10 denotes the finger hole drilling machine. In the drilling machine 10, a main spindle 2 having a drill chuck 3 is provided in the top section of the machine 10. The spindle 2 is smoothly lifted or downed in accordance with opposed directional turning motion of a spindle lever 9. A typical drill 4 is selectively fixed to the drill chuck 3 of the spindle 2. The drilling machine also includes a forward/backward feed table or a first feed table 7 and a leftward/rightward feed table or a second feed table 8, which tables 7 and 8 are movably placed on a base 1 of the machine 10 and moved on the base 1 in accordance with handling motions of their associated handles 5 and 6.

Figure 3:
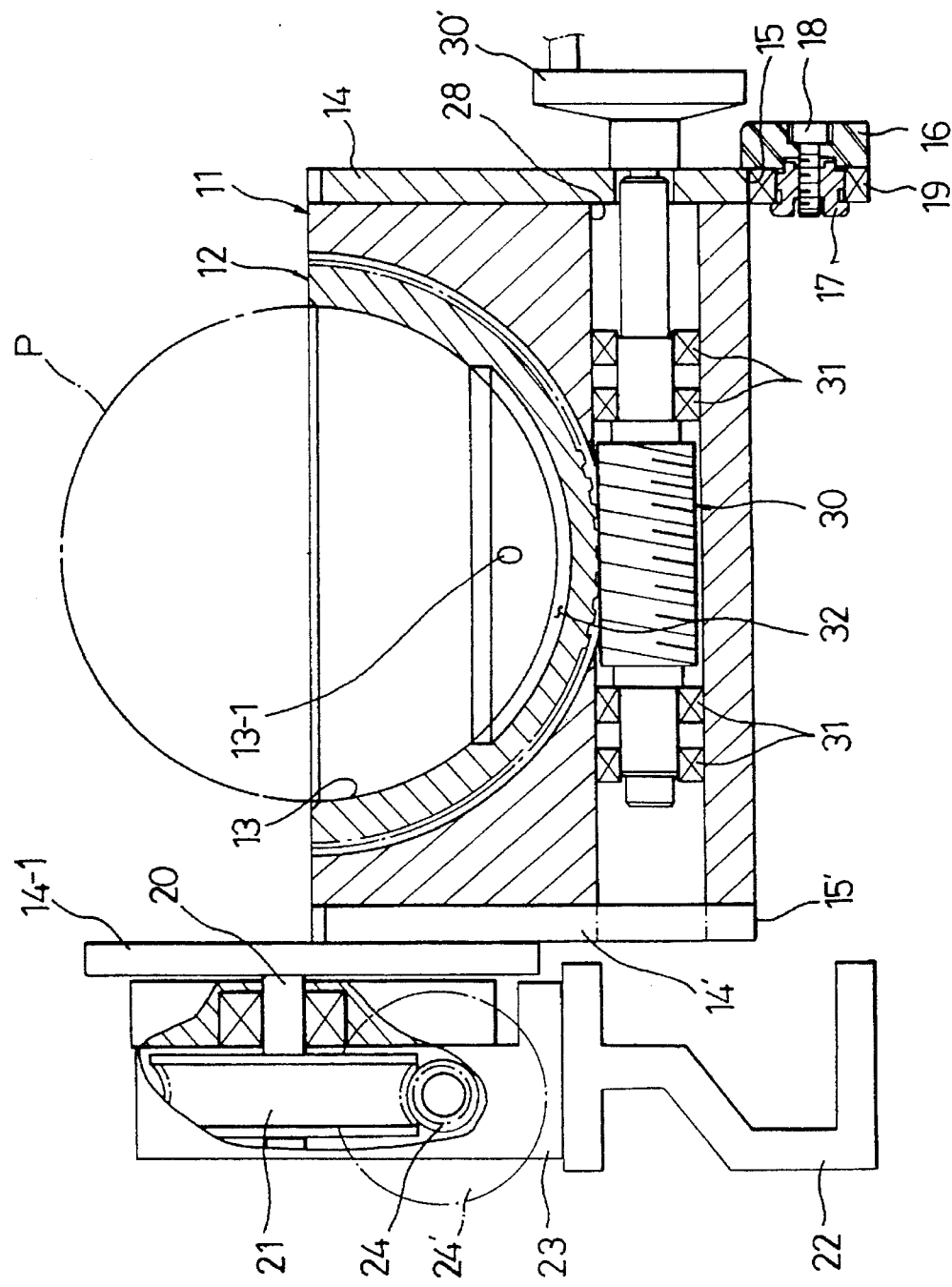
FIG. 3 is a partially enlarged front sectional view of the drilling machine of the invention, showing a ball seat assembly of the drilling machine in detail.
Figure 4:
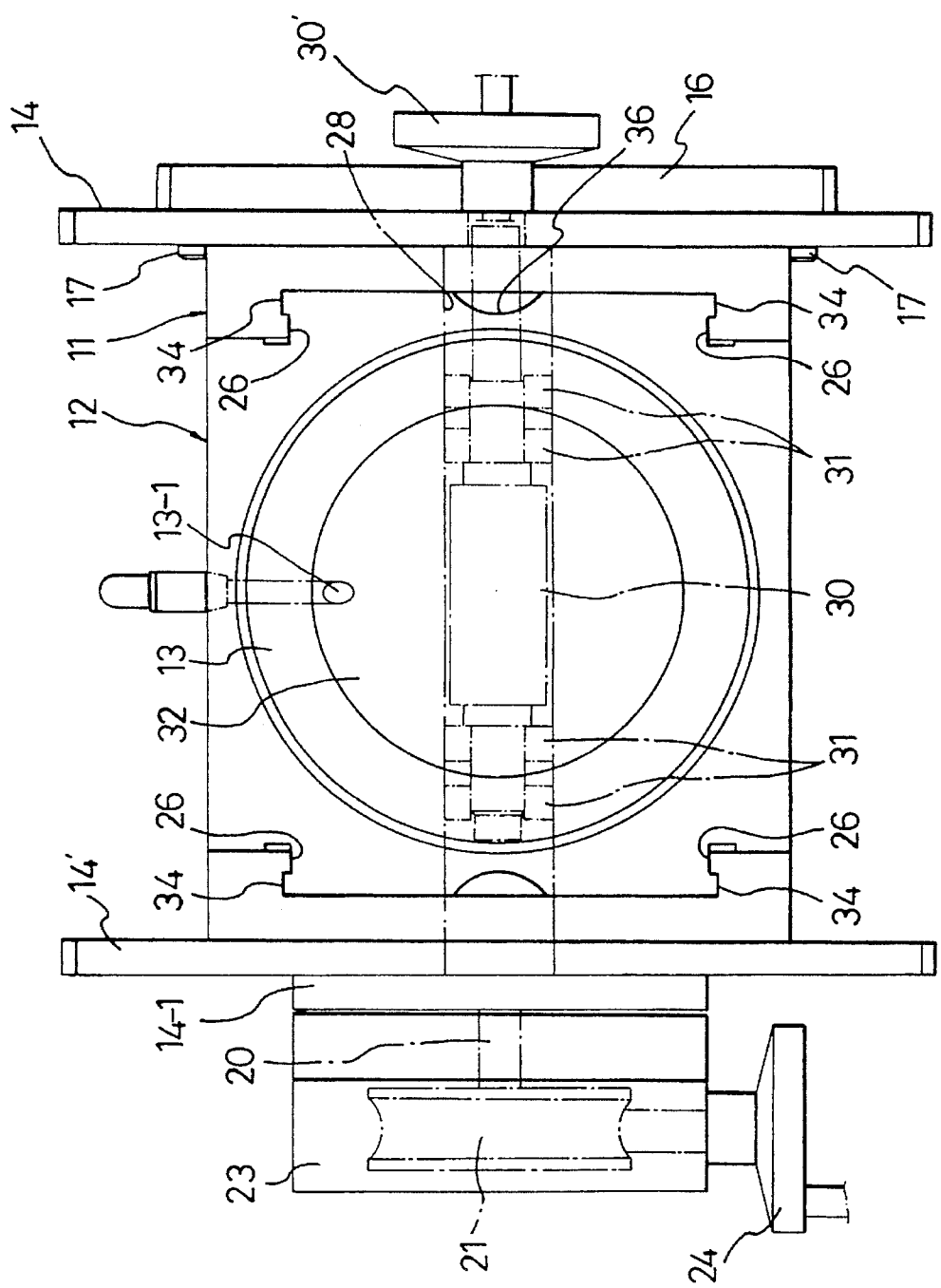
FIG. 4 is a plan view of the ball seat assembly of FIG.
Figure 5:
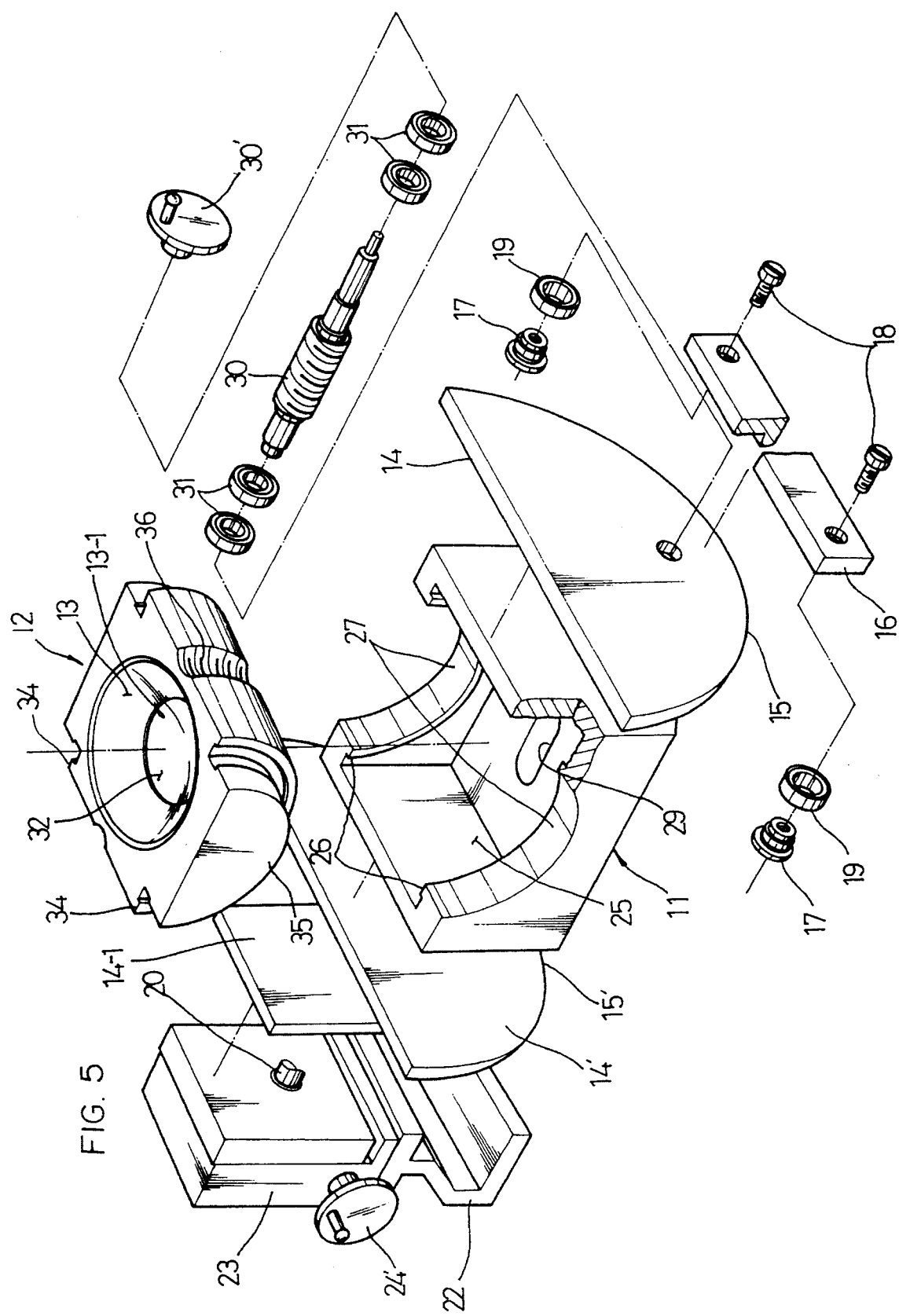
FIG. 5 is an exploded perspective view of the ball seat assembly of FIG. 3.

The drilling machine 10 further includes a ball seat assembly in accordance with the invention. The ball seat assembly includes a ball seat housing 11 which is placed on the first table 7. As best seen in FIGS. 3 to 5, a bowling ball seat 12, which seat 12 has a hemispherical ball seat depression 13 for stably seating and clamping a bowling ball P, is slidably placed on the ball seat housing 11. A marking pen assembly 60 for supporting a marking pen 65, which assembly 60 will be described in detail later herein, is selectively fitted to the drill chuck 3 as shown in FIG. 7. Mounted on a side of the base 1 is a bowling ball turntable assembly 70 which will be described in detail later herein.

As shown in FIGS. 3 to 5, the ball seat housing 11 is a right-angled box housing. A pair of support plates, that is, first and second support plates 14 and 14' having their semicircular slide surfaces 15 and 15', are fixed to its opposed side surfaces respectively. Here, the slide surface 15 of the first support plate 14 slidably contacts with a pair of bearings 19, which bearings 19 are rotatably mounted on internal surfaces of associated support frames 16 fixed to the first feed table 7. When rotatably mounting each bearing 19 on the internal surface of an associated support frame 16, an inner threaded fixture 17 and a fixing bolt 18 are used.

Meanwhile, a guide plate 14-1 is mounted to the external surface of the second support plate 14'. Outward extending from the center of the external surface of the plate 14-1 is a turning shaft 20, which shaft 20 in turn is connected to a worm wheel 21. The worm wheel 21 is rotatably mounted in a gear box 23, which box 23 is placed on a supporter 22 fixed to the first feed table 7. The worm wheel 21 gears into a worm shaft 24 in the gear box 23, which shaft 24 is coupled to a forward/backward directional control handle 24' at the outside of the gear box 23.

The ball seat housing 11 opens to the top, so that it has a rectangular space 25 defined by four vertical walls. The front and rear walls of the housing 11 are semicircularly cut out on their tops, thus to form front and rear semicircular slide surfaces 27. Extending inwardly from the semicircular slide surfaces 27 are semicircular guide projections 26 respectively. The bottom of the ball seat housing 11 is provided with a shaft hole 28, which hole 28 lengthwise extends from the left to the right of the bottom of the housing 11. A longitudinal through hole 29 is vertically formed on the bottom center of the housing 11, so that the shaft hole 28 communicates with the space 25 of the housing 11. A worm shaft 30 is rotatably placed in the shaft hole 28 of the bottom of the housing 11. The worm shaft 30, which is rotatably supported by a plurality of bearings 31 in the shaft hole 28, extends to the outside through a through hole 14-1 of the first support plate 14. The shaft 30 in turn is coupled, at the outside of the first support plate 14, to a left/right directional control handle 30'.

The bowling ball seat 12, which is placed on the ball seat housing 11, is a half cylindrical body whose front and rear surfaces are flat surfaces. The top of the ball seat 12 has the hemispherical ball seat depression 13 for stably seating and clamping the bowling ball P. The seat 12 also includes, in the ball seat depression 13, an air suction/expelling hole 13-1 and an air suction/expelling space 32, so that the hemispherical depression 13 of the seat 12 communicates with an air suction/expelling valve unit 40, which unit 40 will be described in detail later herein.

The semicircular external surface of the ball seat 12 is provided with a pair of semicircular projections 34 on the front and rear sections of the seat 12. The projections 34 form their grooves on the external surface of the seat 12 and will be slidably engaged with their associated guide projections 26 of the slide surfaces 27 of the ball seat housing 11, thus to guide the leftward and rightward sliding motion of the ball seat 12 with respect to the housing 11. The font and rear end sections of the seat 12 are provided with front and rear semicircular sliders 35 which will be slidably laid on the slide surfaces 27 of the housing 11 respectively. Circumferentially formed on the center of the external surface of the ball seat 12 is a depressed worm wheel 36. When the ball seat 12 is placed on the housing 11, the depressed worm wheel 36 of the seat 12 will gear into the worm shaft 30. At this time, the worm shaft 30 received in the shaft hole 28 of the housing bottom will partially protrude its side section to the space 25 of the housing 11 through the longitudinal through hole 29 form on the housing bottom.

Figure 6:
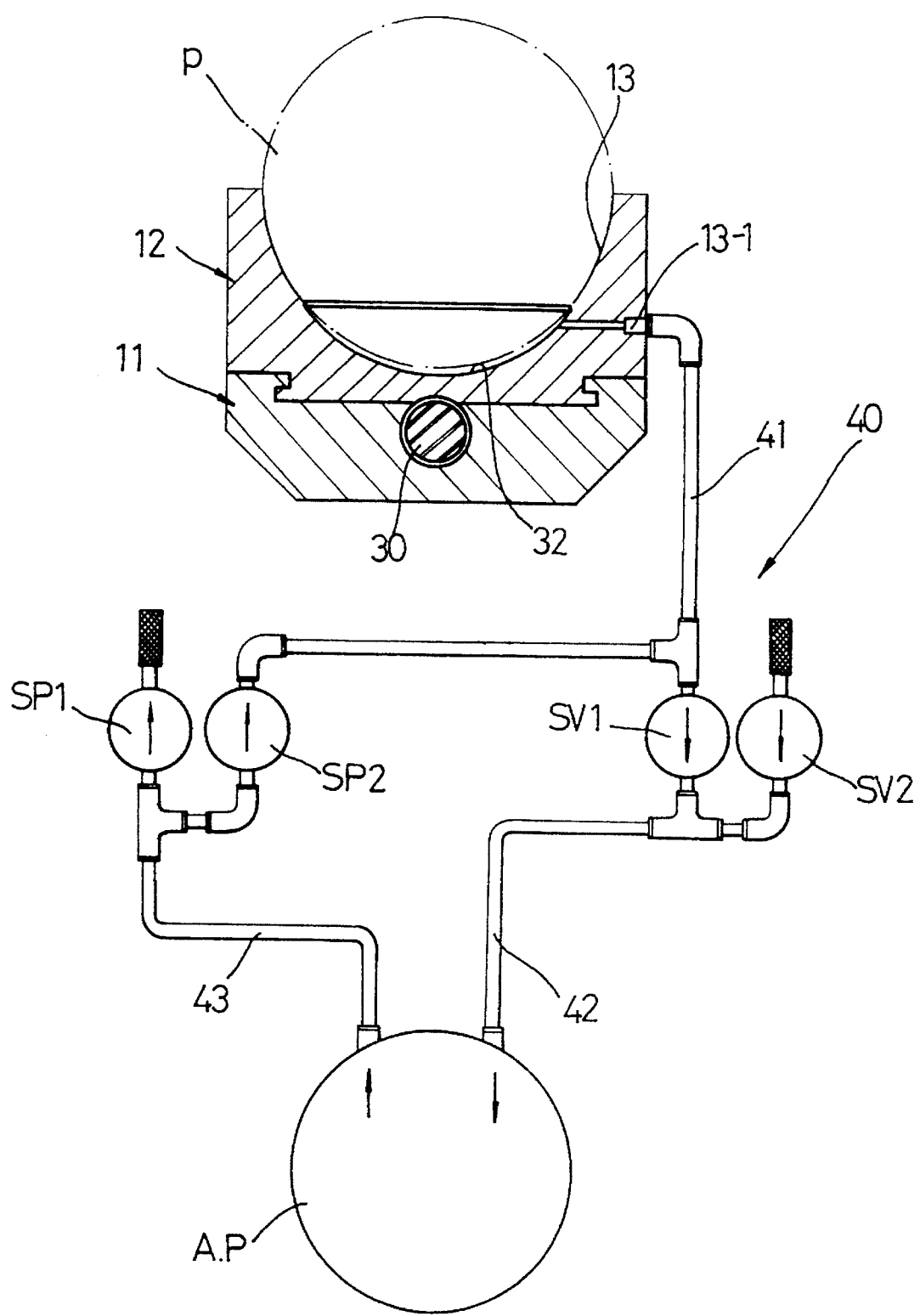
FIG. 6 is a schematic view showing relation between the ball seat assembly of FIG. 3 and an air suction/expelling unit of the drilling machine of the invention.

Turning to FIG. 6 showing the air suction/expelling valve unit 40 in detail, a main air pipe 41 extends from the air suction/expelling hole 13-1. A pair of first branch pipes, which pipes are branched from the main air pipe 41, are connected to an air suction solenoid valve $SV_1$ and to an air expelling solenoid valve $SP_2$ respectively. The first branch pipes in turn are connected to second branch pipes 42 and 43 respectively, which pipes 42 and 43 are coupled to an atmospheric air suction solenoid valve $SV_2$ and to atmospheric air expelling solenoid valve $SP_1$ respectively and also commonly connected to an air pump A.P.

The marking pen assembly 60, which is selectively fitted to the drill chuck 3 and adapted for prominently marking finger hole drilling position marks on the bowling ball P, is shown in detail in FIGS. 7 and 8. As shown in the drawings, the marking pen assembly 60 includes a shank 61 which is fitted to the drill chuck 3. A collet body 63 is coupled, using a shank cover nut 64, to the shank 61 with interposition of a compression coil spring 62, so that the collet body 63 is biased by the coil spring 62 with respect to the shank 61. That is, the shank 61 along with the compression coil spring 62 is received in the outer-threaded collet body 63 and, thereafter, the shank cover nut 64 is tightened to the collet body 63 so as to stop the shank 61 within the collet body 63. Fitted over the distal end of the collet body 63 through screw type fitting is a marking pen chuck 66 for fixing the typical marking pen 65.

Figure 9:
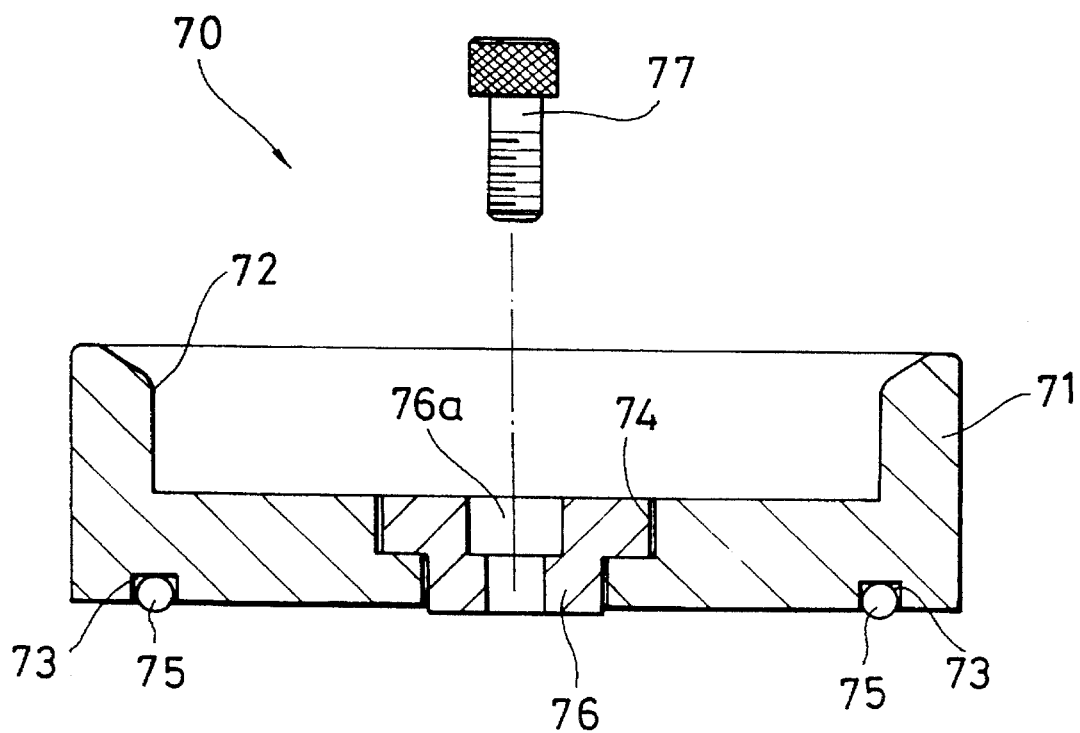
FIG. 9 is an enlarged sectional view of the section "A" of FIG. 2, showing a bowling ball turntable of the drilling machine of the invention.

FIG. 9 shows in detail the bowling ball turntable assembly 70 which is adapted for facilitating the finishing work for the drilled finger holes of the bowling ball P after finger hole drilling. As shown in this drawing, the turntable assembly 70 includes a turntable 71 which is rotatably coupled to the base 1. The turntable 71 is provided with a ball seat depression 72 on its top and with a circular groove 73 on its external bottom surface, and with a stepped shaft hole 74 on its bottom center. A plurality of steel balls 75 are placed in the circular groove 73 of the bottom surface of the turntable 71, while a stepped bush 76 is fitted into the stepped shaft hole 74. The turntable 71 is rotatably coupled to the base 1 of the drilling machine using a set screw 77, so that the turntable 71 can be rotated at 360° with respect to the base 1. Here, when rotatably coupling the turntable 71 to the base 1, the set screw 77 passes through the stepped bush 76 and is screwed to the base 1.

In the drawings, the reference symbol A.N denotes an air nozzle for removing of chip Generated in drilling and the symbol C.B denotes a control box of the drilling machine.

The operational effect of the above finger hole drilling machine will be described hereinbelow.

In order to drill the finger holes on the bowling ball P using the drilling machine of the invention, the bowling ball P marked with finger hole drilling position marks is seated on the hemispherical ball seat depression 13 of the ball seat 12. After seating the ball P on the depression 13, the ball seat 12 is moved by handling the handles 5 and 6 for the first and second feed tables 7 and 8, thus to center the ball seat 12 having the ball P to the drill chuck 3, so that a finger hole drilling position is centered to the chuck 3.

The above centering step is followed by a marking step for prominently marking a finger hole drilling position on the bowling ball P and for facilitating the following drilling operation. In order to carry out the marking step, the marking pen assembly 60 is fitted to the drill chuck 3 of the main spindle 2 instead of the drill 4. In this state, the ball seat 12 carrying the bowling ball P thereon is tilted forward and backward by handling the forward/backward directional control handle 24' and tilted leftward and rightward by handling the left/right directional control handle 30'. Therefore, the marking pen 65 fixed to the pen chuck 66 of the marking pen assembly 60 draws a forward/backward arc line and a leftward/rightward arc line on the ball P, which arc lines will cross with each other at the centered finger hole drilling position of the ball P. Thus, the finger hole drilling position is prominently marked on the bowling ball P.

At this time, the collet body 63 is coupled, using the shank cover nut 64, to the shank 61 with interposition of the compression coil spring 62, so that the collet body 63 can be elastically moved by the coil spring 62 with respect to the shank 61 fixed to the drill chuck 3 as described above. In this regard, the marking pen 65 is not damaged by the bowling ball P even when the marking pen 65 is somewhat exceedingly downed.

After the marking step, the marking pen assembly 60 is removed from the drill chuck 3 and, thereafter, the typical finger hole drill 4 is fitted to the drill chuck 3o The drill chuck 3 along with the drill 4 in turn is appropriately downed by handling of the spindle lever 9, so that the distal end of the drill 4 comes into nearly contact with the finger hole drilling mark of the bowling ball P. Thereafter, the air suction/expelling valve unit 40, which is connected to the air suction/expelling hole 13-1 of the ball seat 12, generates the vacuum clamping force in the hemispherical ball seat depression 13 of the seat 12. With the vacuum clamping force generated in the ball seat depression 13, the bowling ball P to be drilled is stably clamped in the depression 13 of the ball seat 12. In order to generate the vacuum clamping force in the ball seat depression 13 of the seat 12, the air pump A.P of the valve unit 40 is started under the condition that the air suction solenoid valve $SV_1$ is opened, the atmospheric air suction solenoid valve $SV_2$ is closed, the air expelling solenoid valve $SP_2$ is closed and the atmospheric air expelling solenoid valve $SP_1$ is opened. A strong air suction force is thus generated in the main air pipe 41 extending from the air suction/expelling hole 13-1 of the seat 12. The strong air suction force of the main air pipe 41 sucks the air from both the ball seat depression 13 and the air suction/expelling space 32 of the seat 12 through the pipe 41 and vacuumizes the depression 13 carrying the ball P thereon. Hence, the vacuum clamping force is generated in the space 32 of the seat 12, so that the bowling ball P to be drilled is stably clamped in the hemispherical ball seat depression 13 of the seat 12.

After clamping the bowling ball P in the hemispherical depression 13 by the vacuum clamping force of the valve unit 40, the drill chuck 3 along with the drill 4 is again appropriately downed by handling of the spindle lever 9, so that the distal end of the drill 4 comes into contact with the finger hole drilling position mark of the bowling ball P.

After descending of the drill 4, the bowling ball P seated on the ball seat 12 is precisely adjusted in its finger hole drilling angle and in its drilling position. In order to precisely adjust deviation of the drilling angle and of the drilling position of the ball P with respect to the drill 4 in forward or backward direction, the forward/backward directional control handle 24' is handled in order to rotate the worm wheel 21 gearing into the worm shaft 24. The ball seat housing 11 tightly interposed between the opposed support plates 14 and 14', one plate 14' being fixed to the turning shaft 20 connected to the worm wheel 21, thus is slidably tilted on the bearings 19 so as to adjust its position. That is, handling of the forward/backward directional control handle 24' causes the slide surface 15 of the first support plate 14 of the housing 11 to be slidably tilted on the bearings 19, which bearings 19 are rotatably mounted on the internal surfaces of an associated support frames 16 fixed to the first feed table 7. Thus, the ball seat housing 11, which is coupled to the slidably tilting support plate 14 and fixed to the turning shaft 20 through the plate 14', is slidably tilted on the bearings 19, thus to adjust its position. Meanwhile, in order to precisely adjust deviation of the drilling angle and of the drilling position of the ball P with respect to the drill 4 in leftward or rightward direction, the left/right directional control handle 30' of the worm shaft 30 is handled in order to tilt the ball seat 12 on the ball seat housing 11. The tilting motion of the ball seat 12 is achieved by the depressed worm wheel 36 gearing into the worm shaft 30 of the housing 11. The worm wheel 36 formed on the external surface of the ball seat 12 gears into the worm shaft 30, which shaft 30 is received in the shaft hole 28 of the bottom of the housing 11 and partially protrudes its side section to the space 25 of the housing 11 through the longitudinal through hole 29 form on the housing bottom. The ball seat 12 can be thus tilted on the ball seat housing 11 by left/right directional control handle 30' of the worm shaft 30, thus to adjust its position.

The deviation adjusting step is followed by a finger hole drilling step. In the drilling step, the ball P is drilled by the drill 4 at the finger hole drilling position and at the precise drilling angle. The data for the finger hole position is stored in a control unit of the drilling machine by handling the control box C.B. The data will be used in other drilling operations for identically forming the finger holes on other bowling balls at the same positions and at the same drilling angle. Therefore, the operational efficiency of the drilling machine will be more improved particularly when forming identical finger holes on a plurality of bowling balls.

After drilling the finger holes on the ball P, the bowling ball P will be removed from the ball seat 12 by pressurized air expelling force of the valve unit 40. In order to remove the ball P after drilling from the ball seat 12 by pressurized air expelling force, the air pump A.P of the valve unit 40 is started under the condition that the air suction solenoid valve $SV_1$ is closed, the atmospheric air suction solenoid valve $SV_2$ is opened, the air expelling solenoid valve $SP_2$ is opened and the atmospheric air expelling solenoid valve $SP_1$ is closed. A strongly pressurized air is thus provided in the main air pipe 41 extending from the air suction/expelling hole 13-1 of the seat 12. The strongly pressurized air of the main air pipe 41 in turn is expelled to the air suction/ expelling space 32 of the seat 12 and floats the ball P over the hemispherical depression 13 of the seat 12, so that the ball P after the finger hole drilling can be readily removed from the ball seat 12.

The bowling ball P removed from the ball seat 12 is, thereafter, seated on the ball seat depression 72 of the turntable 71 of the turntable assembly 70 so as to finish the drilled finger holes. The finger hole finishing operation for the ball P is carried out while smoothly turning the turntable 71 at 360° turning angle about the stepped shaft hole 74 under the guide of the plurality of steel balls 75 placed in the circular groove 73 of the bottom surface of the turntable 71. Here, the turntable 71 is rotatably coupled to the base 1 of the drilling machine using the set screw 77 at the hole 74 fitted with the stepped bush 76 as described above. With the turntable assembly 70, the drilling machine of the invention readily carries out the finger hole finishing operation for the bowling ball P.

Figure 10:
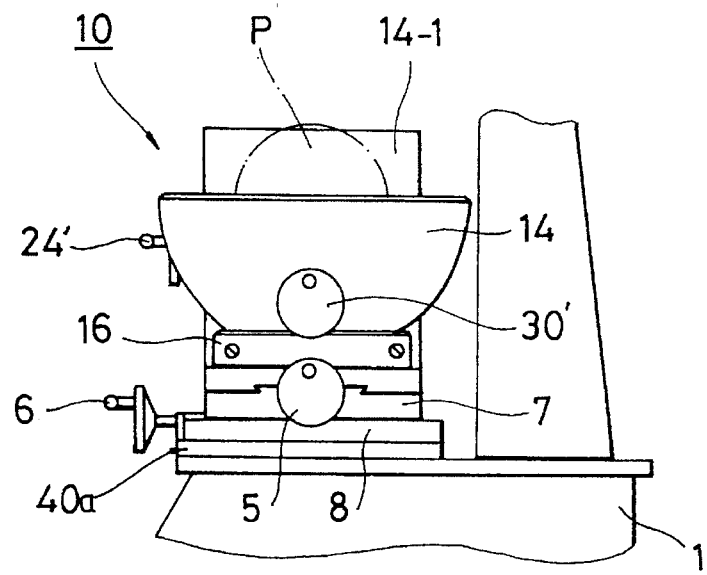
FIG. 10 is a front view of a ball seat assembly of a finger hole drilling machine in accordance with a second embodiment of the invention.

Turning to FIG. 10, there is shown in a front view a ball seat assembly of a finger hole drilling machine in accordance with a second embodiment of the invention. In the second embodiment, the general shape of the drilling machine remains the same as in the primary embodiment, but a rotary table 40a is interposed between the base 1 and the leftward/rightward feed table 8 for readily turning the ball seat assembly. The rotary table 40a is rotatable in any direction at 360° turning angle. With the rotary table 40a, the drilling machine of the second embodiment readily turns the bowling ball P seated on the ball seat 12 and tightly clamped by the valve unit 40, thus to improve the operational effect of the finger drilling machine.

Figure 11:
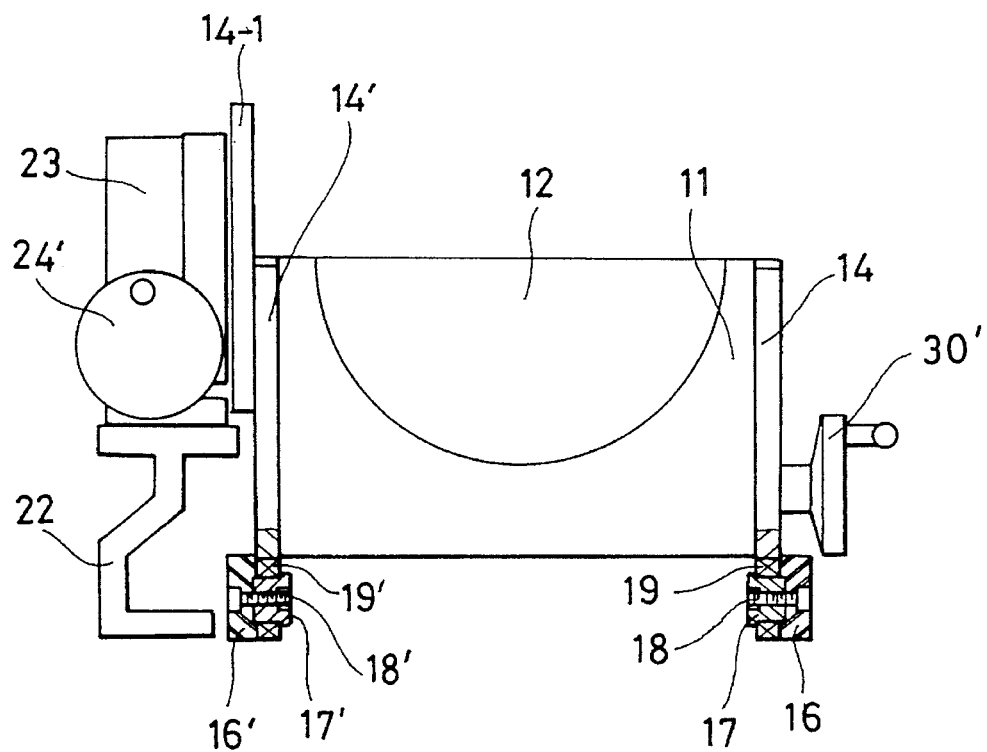
FIG. 11 is a front view of a ball seat assembly of a finger hole drilling machine in accordance with a third embodiment of the invention.

FIG. 11 is a front view of a ball seat assembly of a finger hole drilling machine in accordance with a third embodiment of the invention. In the third embodiment, the general shape of the drilling machine remains the same as in the primary embodiment, but the second support plate 14' of the seat housing 11 is provided with a sliding mechanism in the same manner as that described for the sliding mechanism of the first support plate 14. That is, in the same manner as described for the first support plate 14, the slide surface 15' of the second support plate 14' slidably contacts with a pair of bearings 19', which bearings 19' are rotatably mounted on internal surfaces of associated support frames 16' fixed to the first feed table 7. When rotatably mounting each bearing 19' on the internal surface of an associated support frame 16', an inner threaded fixture 17' and a fixing bolt 18' are used. With the sliding mechanism of the second support plate 14', the drilling machine of the third embodiment improves precision and stability of forward and backward tilting motion of the ball seat housing 11.

Figure 12A:
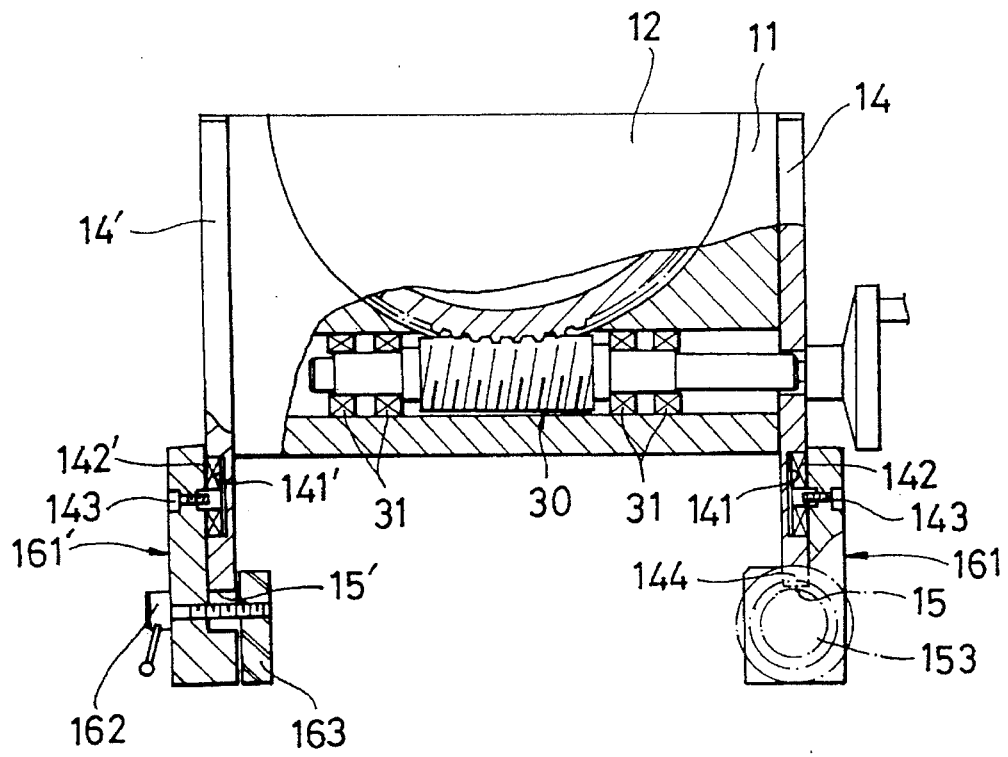
Figure 12B:
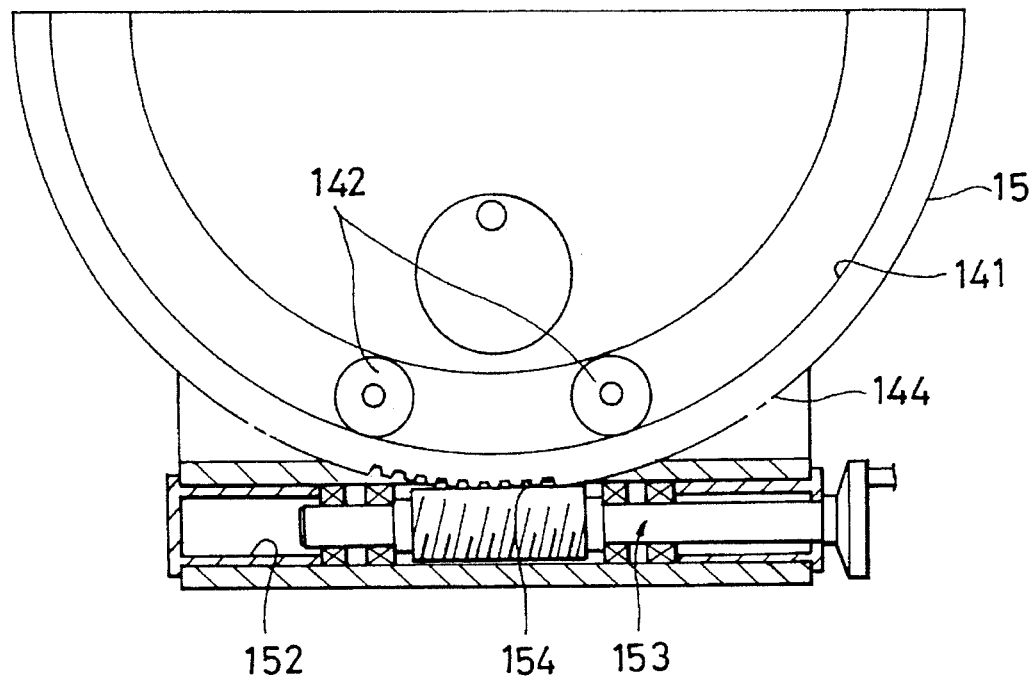

FIGS. 12A and 12B are views of a ball seat assembly of a finger hole drilling machine in accordance with fourth embodiment of the invention. In the fourth embodiment, the general shape of the drilling machine remains the same as in the primary embodiment. However, the first and second support plates 14 and 14' having their semicircular slide surfaces 15 and 15' of the ball seat housing 11 are provided with guide slots 141 and 141' on their external surfaces respectively. The guide slots 141 and 141' receive their guide bearings 142 and 142' therein respectively. The first and second support plates 14 and 14' are rotatably coupled to their associated support frames 161 and 161' of the forward and backward feed table 7 using bolts 143.

In the further embodiment, the slide surface 15 of the first support plate 14 is provided with a worm wheel 144 which in turn gears into a worm shaft 153 through a hole 154 formed in the first support frame 161. Here, this worm shaft 153, which is received in a shaft hole 152 of the first frame 161, partially protrudes its side section to the support plate 14 of the housing 11 through the through hole 154 form in the first support frame 161 and gears into the worm wheel 144 of the plate 14.

In addition, a tightening bolt 162 is inwardly mounted in the second support frame 161' at the side of the second support plate 14'. The tightening bolt 162 has a compressing disc 163 on its inside end, so that the slide surface 15' of the second support plate 14' will be interposed between the second support frame 161' and the compressing disc 163. The position of the compressing disc 163 relative to the sliding surface 15' is adjustable in accordance with tightening motion of the tightening bolt 162. In drilling machine of the fourth embodiment, the ball seat housing 11 along with the ball seat 12 is tilted forward or backward under the guide of the guide bearings 142 and 142' by handling the worm shaft 153 of the first support frame 161, which worm shaft 153 gears into the worm wheel 144 of the first support plate 14 as described above. After tilting the ball seat housing 11 along with the ball seat 12, the tightening bolt 162 of the second support frame 161' is tightened, so that the compressing disc 163 compresses the slide surface 15' of the second support plate 14' and fixes the adjusted forward or backward tilting angle of the ball seat housing 11 relative to the forward and backward feed table 7. After fixing the adjusted tilting angle of the ball seat housing 11, the leftward or rightward tilting angle of the ball seat 12 relative to the housing 11 is adjusted by handling the worm shaft 30 of the ball seat housing 11.

Figure 13A:
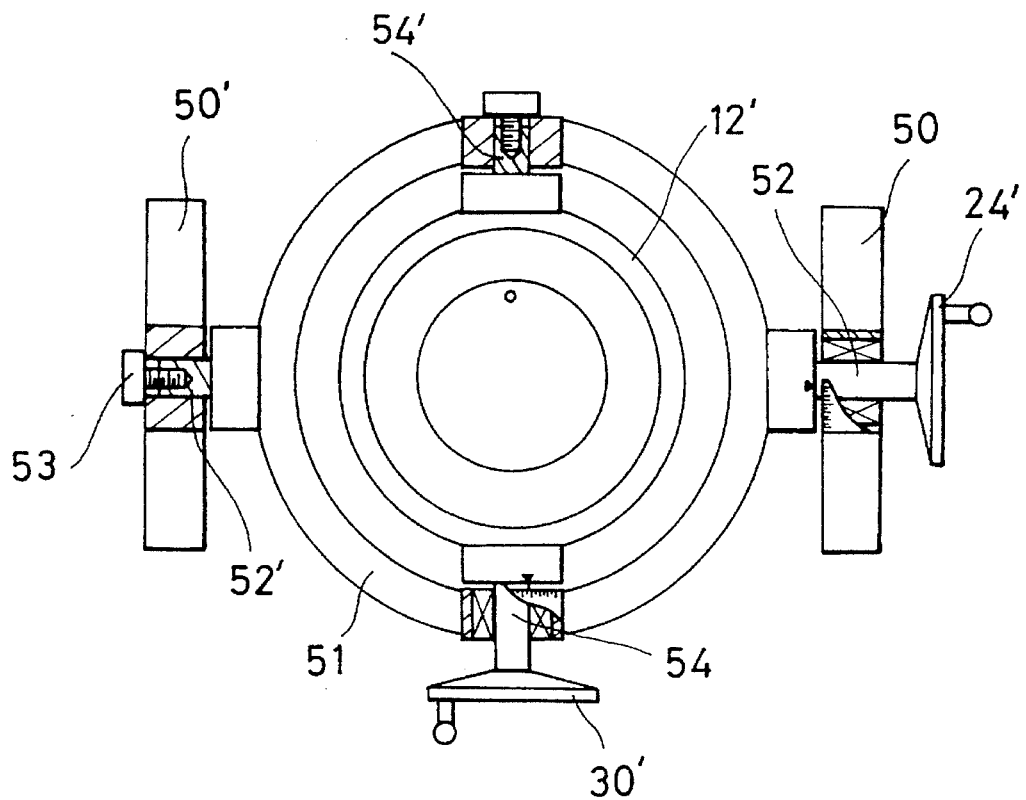
Figure 13B:
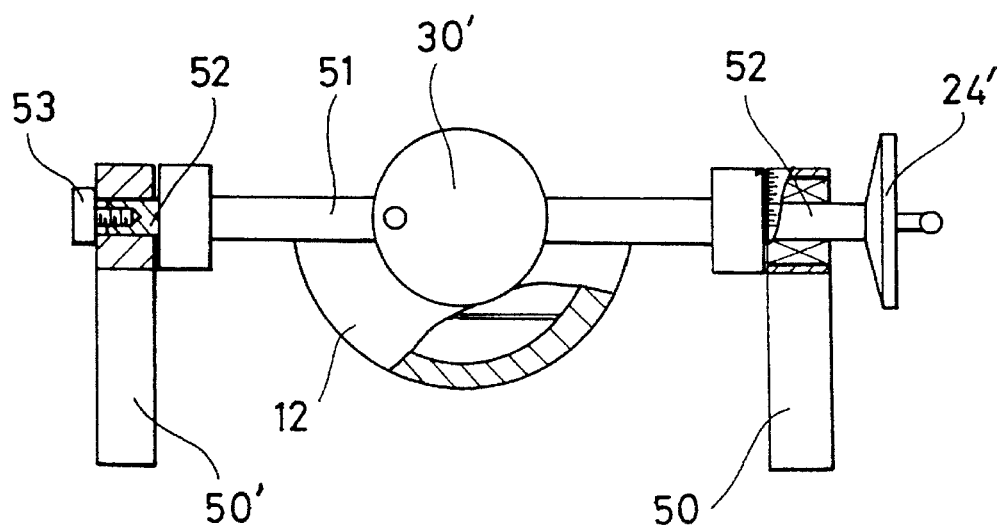

Turning FIGS. 13A and 13B, there is shown a ball seat assembly of a finger hole drilling machine in accordance with a fifth embodiment of the invention. In the fifth embodiment, a pair of supporters 50 and 50' are fixed to the opposed sides of the forward and backward feed table 7. A support ring 51 is placed between the two supporters 50 and 50' and concentrically coupled to the supporters 50 and 50' through their associated first support shafts 52 and 52'. In the drilling machine of the fifth embodiment, the forward and backward tilting angle of the ball seat 12 relative to the supporters 50 and 50' of the table 7 is adjusted by handling a turning handle 24' coupled to the first support shaft 52. After adjusting the tilting angle of the seat 12, the adjusted tilting angle of the seat 12 is fixed by a set bolt 53 screwed to the second support shaft 52' of the second supporter 50' In the support ring 51, a hemispherical ball seat 12' is rotatably coupled to the support ring 51 at the diametrically opposed sections of the ball seat 12' through a pair of second support shafts 54 and 54'. Here, the concentric axis of the second shafts 54 and 54' crosses with the concentric axis of the first shafts 52 and 52' The left/right directional control handle 30' is fixed to the support shaft 54, while a set bolt is screwed to the support shaft 54'. The leftward and rightward tilting angle of the ball seat 12 relative to the table 7 is adjusted by handling the handle 30'. After adjusting the leftward or rightward tilting angle of the seat 12, the adjusted tilting angle of the seat 12 is fixed by the set bolt screwed to the support shaft 54'.

Figure 14A:
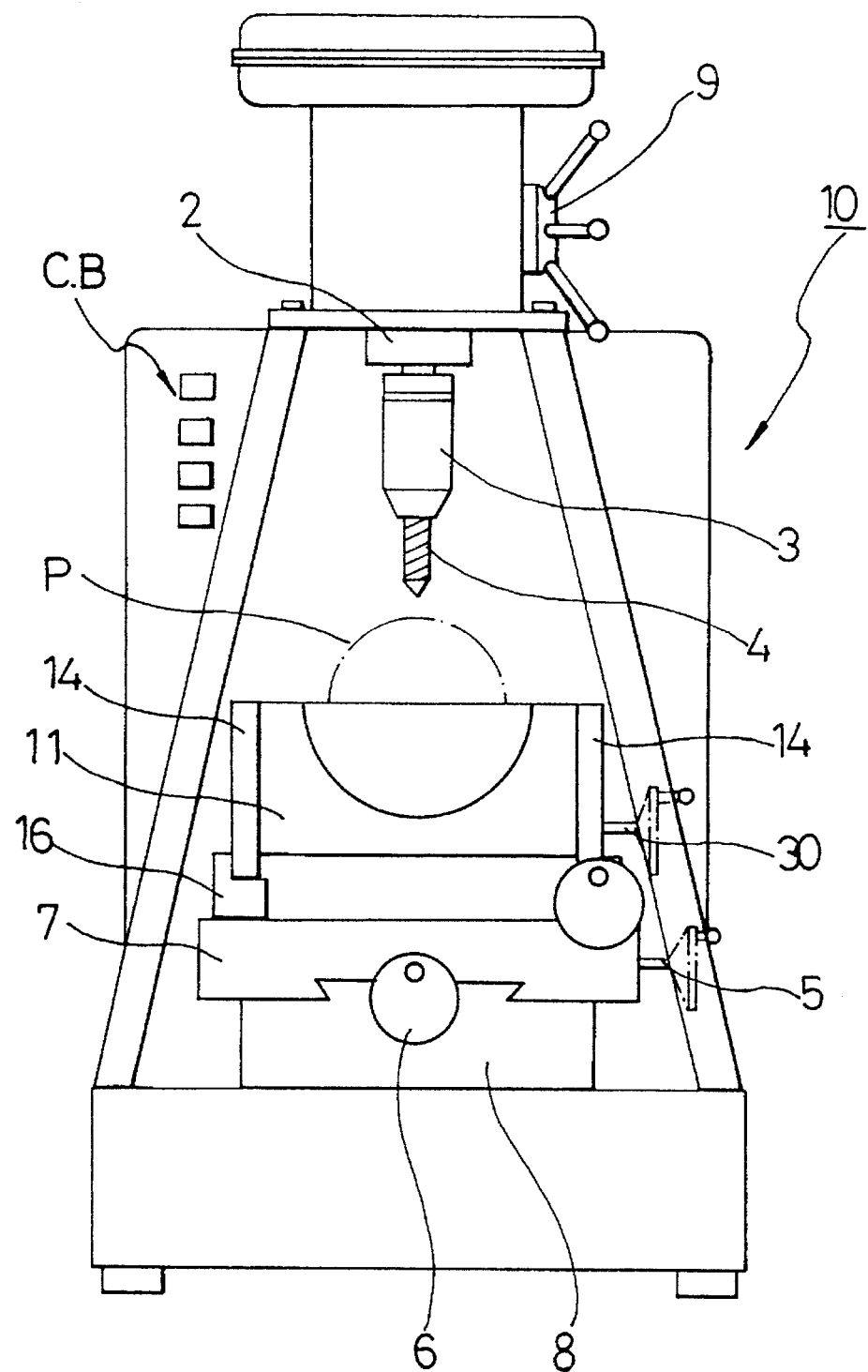
Figure 14B:
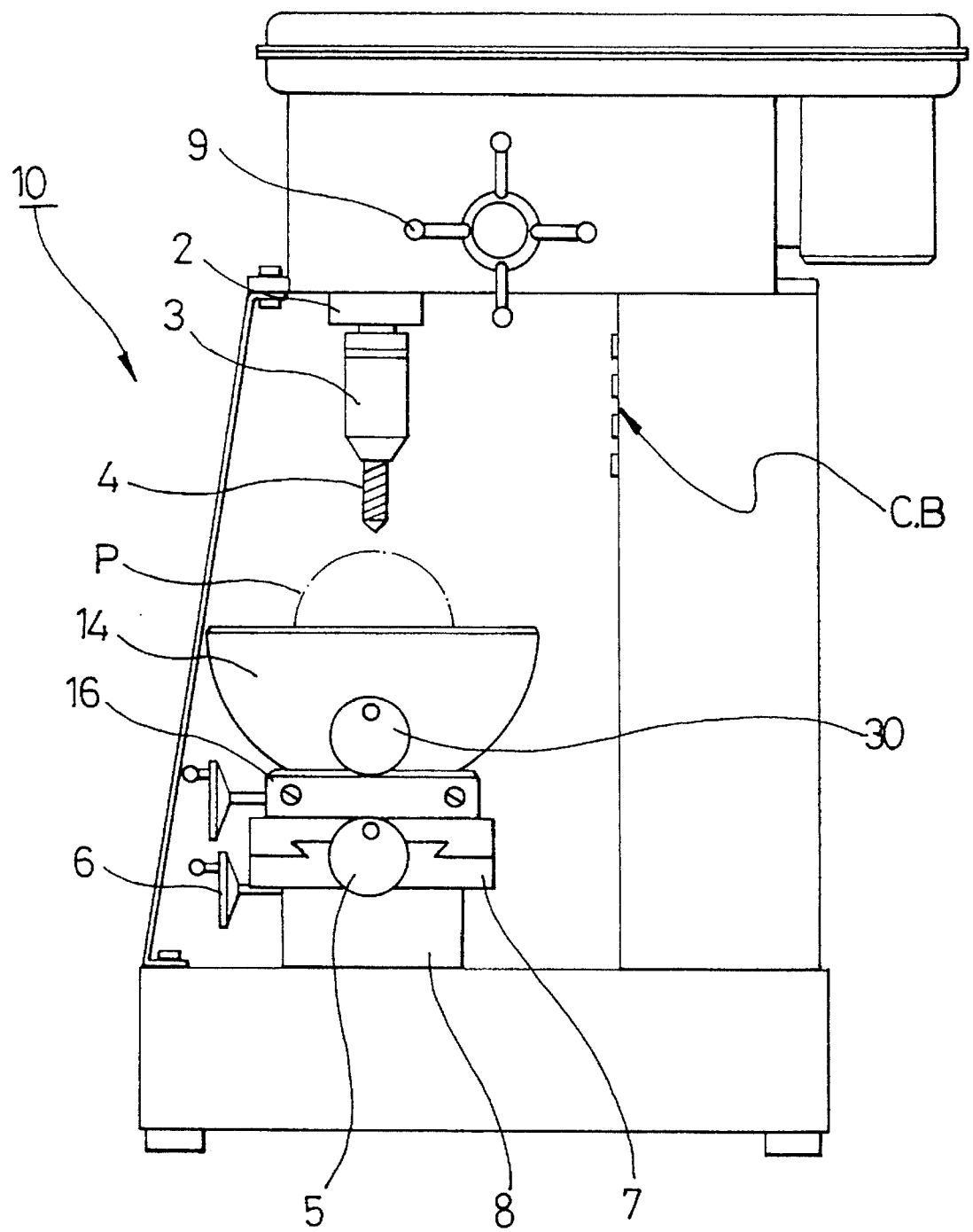

On the other hand, FIGS. 14A and 14B are views of a finger hole drilling machine in accordance with a sixth embodiment of the invention. In the sixth embodiment, the control box C.B is placed in the rear middle section of the drilling machine, thus to improve the outer appearance of the drilling machine.

As described above, the present invention provides a finger hole drilling machine for a bowling ball which precisely drills the finger holes on a plurality of bowling balls at the same positions and at the same drilling angles, thus to achieve identity of the finger holes of the bowling balls and to improve operational efficiency of the drilling machine when identically forming the finger holes on the plurality of bowling balls of a bowler. Another advantage of the drilling machine of the invention is resided in that it easily clamps the bowling ball and easily tilts the bowling ball and easily marks the finger hole drilling positions on the bowling ball.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A finger hole drilling machine for a bowling ball comprising a drill chuck fitted to a spindle, a forward/backward feed table and a leftward/rightward feed table, both tables being placed on a base, wherein the improvement comprises:

a ball seat housing of the box type for tilting said bowling ball forward and backward, said ball seat housing having:

front and rear semicircular slide surfaces provided in the front and rear walls of the ball seat housing, said slide surfaces being formed by partially cutting out the front and rear walls of the housing so as to form semicircular recesses on the front and rear walls;

first and second support plates having semicircular slide surfaces, said support plates being mounted to left and right external side surfaces of the seat housing, each of the first and second support plates of the seat housing having a guide slot provided on an external surface;

a guide bearing received in each of said guide slots;

a pair of bolts for rotatably coupling the guide bearings to a pair of support frames of the forward and backward feed table;

a first worm wheel provided on the slide surface of said first support plate;

a first worm shaft gearing into said first worm wheel through a hole formed in one of the support frames, said first worm shaft being received in a shaft hole of one of the support frames;

a tightening bolt inwardly mounted in the other support frame at the side of said second support plate of the seat housing;

a compressing disc coupled to an inside end of said tightening bolt, said compressing disc selectively compressing the slide surface of said second support plate interposed between the other support frame and said compressing disc; and a second worm shaft rotatably received in a shaft hole formed in the bottom of said seat housing, said second worm shaft exposing its side section into a space of the seat housing through a longitudinal through hole formed in the bottom of the housing above the shaft hole;

a ball seat for tilting the bowling ball leftward and rightward, said ball seat being movably placed on said ball seat housing and having;

a hemispherical ball seat depression for stably seating and clamping the bowling ball, said depression being provided on the top of the ball seat;

an air suction/expelling through hole extending from said seat depression to an air suction/expelling valve unit;

an air suction/expelling space defined in said ball seat depression and communicating with said air suction/expelling through hole;

front and rear semicircular sliders externally provided on the front and rear end sections of the ball seat, said sliders being slidably laid on said front and rear slide surfaces of the front and rear walls of the seat housing respectively; and a depressed second worm wheel formed on the external surface of the ball seat, said second worm wheel gearing into said second worm shaft of the seat housing.

* * * * *